US006697378B1

(12) United States Patent
Patel

(10) Patent No.: US 6,697,378 B1
(45) Date of Patent: Feb. 24, 2004

(54) METHOD AND APPARATUS FOR CLASS BASED TRANSMISSION CONTROL OF DATA CONNECTIONS BASED ON REAL-TIME EXTERNAL FEEDBACK ESTIMATES OBTAINED USING MESSAGING FROM A WIRELESS NETWORK

(75) Inventor: Achal Patel, McKinney, TX (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/174,273

(22) Filed: Oct. 16, 1998

(51) Int. Cl.[7] .............................. H04J 3/16; H04J 3/24; H04Q 7/00; H04Q 7/28
(52) U.S. Cl. ...................... 370/468; 370/328; 370/329; 370/330; 370/341; 370/349
(58) Field of Search .................. 370/328, 329–330, 370/341, 349, 468, 465, 469, 477, 252, 331, 415–419, 428, 429

(56) References Cited

U.S. PATENT DOCUMENTS

| 5,257,283 A | 10/1993 | Gilhousen et al. ............. 375/1 |
| 5,293,640 A | 3/1994 | Gunmar et al. ............ 455/33.1 |
| 5,301,359 A | 4/1994 | Van den Heuvel et al. 455/56.1 |
| 5,561,839 A | 10/1996 | Osterberg et al. .......... 455/33.1 |
| 5,603,085 A | 2/1997 | Shedlo ...................... 455/33.1 |
| 5,666,356 A * | 9/1997 | Fleming et al. ............. 370/328 |
| 5,734,967 A | 3/1998 | Kotzin et al. ................. 455/63 |
| 5,745,480 A | 4/1998 | Behtash et al. ............. 370/252 |

(List continued on next page.)

FOREIGN PATENT DOCUMENTS

| EP | 0 831 669 A2 | 3/1998 | ............ H04Q/7/38 |
| EP | 0 841 763 A1 | 5/1998 | ............ H04B/7/26 |
| EP | 1 041 850 A1 | 10/2000 | ............ H04Q/7/38 |
| WO | WO 98/45966 | 10/1998 | ............ H04B/7/24 |
| WO | WO 98/52288 | 11/1998 | ............ H04B/1/00 |
| WO | WO 99/53630 | 10/1999 | ........... H04B/7/005 |

OTHER PUBLICATIONS

*Data Networks*, Bertsekas et al., 1987.
B. Bakshi, et al., "Improving Performance of TCP over Wireless Networks," IEEE 17th International Conference on Distributed Computing Systems, 10 pages, May, 1997.
Timothy Ju and Gary Ogasawara, "Congestion Control By Traffic Shaping for Ground//Satellite Network," XP–002140800, Milcom '97 Proceedings, Nov. 2–5, 1997, 5 pages.

(List continued on next page.)

*Primary Examiner*—Dang Ton
*Assistant Examiner*—Ronald Abelson
(74) *Attorney, Agent, or Firm*—Baker Botts L.L.P.

(57) ABSTRACT

A system of wireless network with capabilities of transporting data packets, wherein the data transmission activity of each data connection is determined using the localized air interface capacity threshold and available bandwidth estimates obtained via the messages sent by the wireless network (FIG. 3). The system provides a unique and efficient way of providing control over data packet transmissions over a wireless network. The localized wireless network capacity threshold and available bandwidth estimates are obtained via use of empirical formulae and are improved upon via the use of messaging obtained from the wireless network by the Bandwidth Estimator (302) (FIG. 5 and 6). The data transmission activity factors of all data connections are determined by the Bandwidth Estimator using the localized capacity threshold and available bandwidth estimates, along with the priority/class of traffic of specific data calls (FIG. 7). The data transmission activity factors are implemented using the transmission window size update and local queuing by the Data Controller (300) (FIG. 8). Various implementations and interconnectivities of the Bandwidth Estimator and Data Controller functions are outlined (FIGS. 9–13).

17 Claims, 7 Drawing Sheets

U.S. PATENT DOCUMENTS

| | | | |
|---|---|---|---|
| 5,768,260 A | 6/1998 | Lindgren et al. | 370/252 |
| 5,805,585 A | 9/1998 | Javitt et al. | 370/342 |
| 5,862,485 A | 1/1999 | Linneweh, Jr. et al. | 455/450 |
| 5,923,650 A | 7/1999 | Chen et al. | 370/331 |
| 5,987,326 A | 11/1999 | Tiedemann, Jr. et al. | 455/442 |
| 5,995,805 A | 11/1999 | Ogasawara et al. | 455/13.1 |
| 6,016,307 A * | 1/2000 | Kaplan et al. | 370/238 |
| 6,021,309 A | 2/2000 | Sherman et al. | 455/12.1 |
| 6,052,361 A * | 4/2000 | Ansari et al. | 370/232 |
| 6,070,084 A | 5/2000 | Hamabe | 455/522 |
| 6,128,490 A * | 10/2000 | Shaheen et al. | 455/434 |
| 6,151,309 A | 11/2000 | Busuioc et al. | 370/328 |
| 6,157,668 A | 12/2000 | Gilhousen et al. | 375/130 |
| 6,181,738 B1 | 1/2001 | Chheda et al. | 375/224 |
| 6,226,283 B1 | 5/2001 | Neumiller et al. | 370/340 |
| 6,289,005 B1 * | 9/2001 | Katz | 370/328 |
| 6,304,562 B1 * | 10/2001 | Kim et al. | 370/332 |
| 6,324,185 B1 | 11/2001 | Budhraja | 370/468 |
| 6,327,254 B1 * | 12/2001 | Chuah | 370/328 |
| 6,347,224 B1 | 2/2002 | Smyth et al. | 455/406 |
| 6,370,114 B1 * | 4/2002 | Gullicksen et al. | 370/229 |

OTHER PUBLICATIONS

S. Biaz and N. Vaidya, "Discriminating Congestion Losses from Wireless Losses using Inter–Arrival Times at the Receiver," IEEE Symposium Application–Specific Systems and Software Engineering Technology (ASSET), 8 pages, Mar., 1999.

G. Holland and N.H. Vaidya, "Analysis of TCP Performance over Mobile Ad Hoc Networks," Fifth Annual ACM/IEEE International Conference on Mobile Computing and Networking (MOBICOM), 13 pages, Aug., 1999.

G. Holland and N.H. Vaidya, "Impact of Routing and Link Layers on TCP Performance in Mobile Ad Hoc Networks," IEEE Wireless Communications and Networking Conference (WCNC), 5 pages, Oct., 1999.

U.S. patent application Ser. No. 09/466,308, entitled "Method and System for Allocating Bandwidth in a Wireless Communications Network," filed Dec. 17, 1999, 85 pages. (062891.0475) Dec. 17, 1999.

U.S. patent application Ser. No. 09/513,914, entitled "Wireless Router and Method for Processing Traffic in a Wireless Communications Network," filed Feb. 25, 2000, 87 pages. (062891.0479), Feb. 25, 2000.

U.S. patent application Ser. No. 09/513,913, entitled "Method and System for Managing Transmission Resources in a Wireless Communications Network" filed Feb. 25, 2000, 73 pages, (062891.0474), Feb. 25, 2000.

U.S. patent application Ser. No. 09/513,090, entitled "Method and System for Configuring Wireless Routers and Networks," filed Feb. 25, 2000, 94 pages. (062891.0481).

U.S. patent application Ser. No. 09/513,592, entitled "Method and System for Brokering Bandwidth in a Wireless Communications Network," filed Feb. 25, 2000, 50 pages. (062891.0478).

U.S. patent application Ser. No. 09/513,912, entitled "Method and System for Queuing Traffic in a Wireless Communications Network," filed Feb. 25, 2000, 94 pages. (062891.0477).

CA*net II Differentiated Services. Bandwidth Broker System Specification, British Columbia Institute of Technology, Technology Centre, Group for Advanced Information Technology, http://www.internet2.edu/qos/gbone/QB BAC.shtml, Online Oct. 4, 1998, XP–002136418, 13 pages, Apr. 25, 2000.

U.S. patent application Ser. No. 09/591,077, entitled "Method and System for Dynamic Soft Handoff Resource Allocation in a Wireless Network," filed Jun. 9, 2000, 66 pages. (062891.0473).

U.S. patent application Ser. No. 09/908,225, entitled "Method and System of Integrated Rate Control for a Traffic Flow Across Wireline and Wireless Networks," filed Jul. 18, 2001, 32 pages, (062891.0480).

Sally Floyd, "TCP and Explicit Congestion Notification" Lawrence Laboratory, Berkeley, CA 94704.

Gilhousen, et al. "On the Capacity of a cellular CDMA system", IEEE Transactions on Vehicular Technology, vol. 40, No. 2, May 1991.

Viterbi, et al. "Erlang Capacity of a power controlled CDMA system".

* cited by examiner

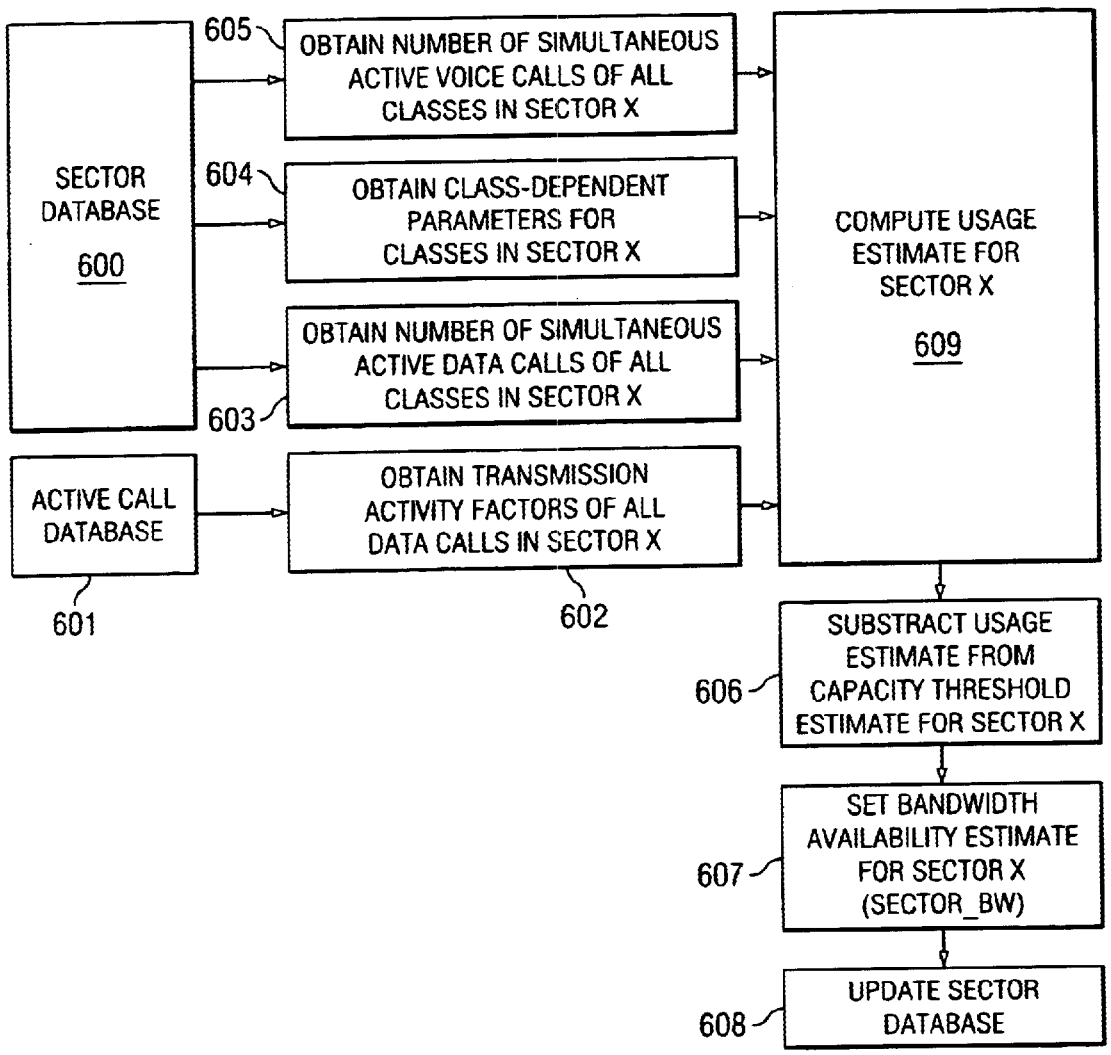
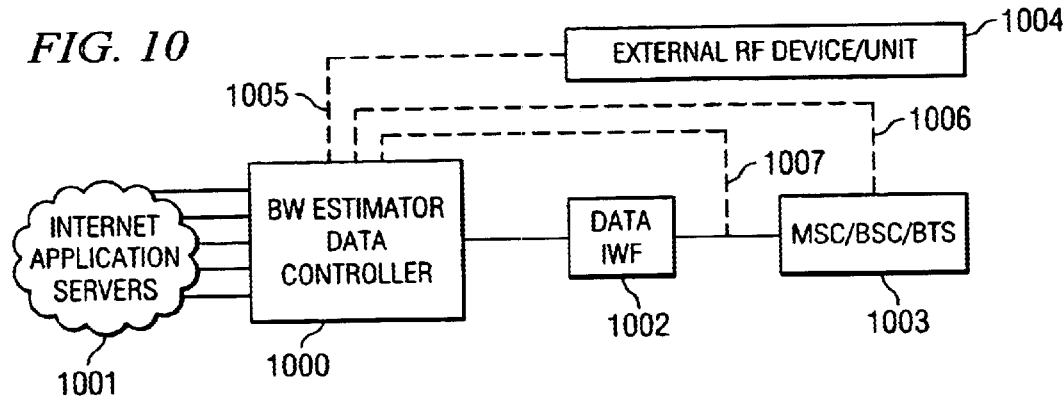

METHOD AND APPARATUS FOR CLASS BASED TRANSMISSION CONTROL OF DATA CONNECTIONS BASED ON REAL-TIME EXTERNAL FEEDBACK ESTIMATES OBTAINED USING MESSAGING FROM A WIRELESS NETWORK

CROSS REFERENCES

For background information, this patent refers to the following publications,

[Ref-1] "TCP and Explicit Congestion Notification", Sally Floyd, Lawrence Berkeley Laboratory, Berkeley, Calif. 94704.

[Ref-2] "On the Capacity of a Cellular CDMA System", Gilhousen, et. al., IEEE Transactions on Vehicular Technology, Volume 40, No. May 2, 1991.

[Ref-3] "Erlang Capacity of a Power Controlled CDMA System", Viterbi, et. al.

BACKGROUND

1. Field of Invention

The invention relates to control of packet transmissions of various classes of IP/data traffic and obtaining/using capacity estimates from a wireless network. In particular the invention relates to, 1. estimating the available link bandwidth in a wireless network using messages (standard and proprietary) from the wireless network and/or other estimates from an external device, and
2. combining the estimate with priority/class-based control of data packet transmissions to provide an efficient use of available bandwidth (capacity) per cell (sector) on the air interface (wireless link).

2. Description of Prior Art

In order to describe the background of this invention, details on the following two areas need to be presented:

1. Bandwidth management and transmission control in data networks such as IP networks, and
2. Real-time capacity and loading in a wireless network, and the overall network architecture TCP/IP (Transport Control Protocol/Internet Prototol) is a very well established, widely used standard protocol for data/voice communications over packet networks [REF-1]. TCP handles each connection independently and maintains an end-to-end flow control. As shown in FIG. 1, the sender (103) and the receiver (103) maintain an end-to-end TCP (104) peer relationship. Whereas both the sender and the receiver maintain a IP layer (105) relationship with the router (101). The TCP employs retransmissions and window size control on each data connection making it reliable even when the underlying routing/switching systems experience congestion or temporary failures. The physical layer (100) and layer 2 (106) in such networks can be various standard and/or proprietary methods such as, ethernet, frame relay, ATM, SONET, T1, etc. Though the TCP and IP protocol layers are independent of the lower layers, their performance and efficiency depends on the lower layers.

Several methods of implementing and improving TCP flow control have been developed, but the most basic method is the window-based flow control. When TCP on the receiving machine sends an acknowledgement, it includes a window update in the segment to tell the sender how much buffer space the receiver has available for additional data. The window update specifies the amount of data the receiver can accept beyond the data being acknowledged. The TCP sender sends the amount of data indicated by the window size. The TCP sender also estimates the round trip delay which is used to set/control the TCP window size, which implicitly controls the TCP rate. A window update of zero completely halts the sender transmission. Transmission is resumed upon receiving an acknowledgement with a non-zero window size. In general, the TCP protocol uses the window updates along with other algorithms to control the flow and avoid congestion across the connection.

Current TCP/IP networks rely on packet drops as an indication of congestion. Upon experiencing packet losses, the TCP sender retransmits the lost packet and lowers its window size to reduce the amount of data being sent at a time.

An indirect method to control the data flow of TCP connections is to introduce controllable queues in the transmission path. One such example would be an IP queue in an IP router (101). By queuing (delaying) IP packets, the measured roundtrip delay increases (with potential for TCP timeout), which automatically reduces the TCP window update, thereby lowering the effective TCP data rate. Such methods can be applied to various classes of IP traffic with pre-defined rules. New enhancements include methods to use Explicit Congestion Notification (ECN) [REF-1]. ECN is done by sending a one-bit notification to the sender indicating congestion. The sender TCP then reacts to the ECN bit by lowering the TCP window size to one and initiating a slow-start session.

The TCP window and other capabilities of the TCP/IP protocol provide the necessary capabilities to implement various bandwidth management algorithms.

The other aspect of the background is the wireless network architecture, and the associated capacity and loading. FIG. 2 shows a typical cellular/PCS wireless network and its key components. A typical cellular network (200) covers a contiguous area that is generally broken down by a series of cells (201). Each cell has a base station (202) and may be subdivided into sectors. The base-station maintains a radio link with the mobile station (203) (eg. a cellphone, or a fixed wireless terminal, or a handheld wireless computing device). The other system elements include a Mobile Switching Center (MSC) (205), Base Station Controller (BSC) (204), and a data InterWorking Function (IWF) (206). The data IWF (206) is the entity that provides connectivity of the wireless network (and mobile stations) to the IP/data network via circuit switched and packet switched wireless data protocols.

The cellular network layout provides coverage and serves the mobile and fixed wireless stations with a wireless link to the cells (sectors). The wireless, RF (radio frequency) link to the cells could be based on established industry standards such as IS-54 (TDMA—Time Division Multiple Access), IS-95 (CDMA—Code Division Multiple Access), and GSM (Global System for Mobile Communications), or new upcoming standards such as cdma2000 and WCDMA, or proprietary radio interfaces. Typically a cell (sector) is able to support a certain number of wireless calls. This capacity, number of simultaneous active calls per cell (sector) is a function of (depends on) various factors such as frequency reuse, carrier to interference ratio, bit-energy to noise ratio, effective bit-rate per call (voice or data), frame error rate (FER), etc. Several studies have been done in estimating the air link capacity in a wireless network [Ref-2, Ref-3]. The radio spectrum (frequency band) used in a particular cell (sector) is reused in every "n" cells (sectors). For example, in a CDMA (IS-95-based) system, n=1 indicating that the frequency band is being re-used in every cell (sector). In other cellular systems such as GSM and TDMA, "n" could be 3, 4 or 7 or any fraction thereof. The frequency reuse factor "n", carrier to interference ratio (C/I), bit energy to noise ratio (Eb/No), processing gain, handoff gain, total time-slots, total frequency channels, total power, expected data rate per user, expected power per user, and engineering specifications (amongst other factors) determine the maximum capacity per cell (sector) that can be supported to ensure service within certain performance metrics. In some systems, such as CDMA (IS-95, W-CDMA, cdma2000), the capacity per cell (sector) indicates a threshold such that the system or call performance degrades below a certain quality of service if the traffic in the cell (sector) exceeds the threshold. Typically cellular/PCS wireless networks are engineered such that the number of simultaneous active calls per cell (sector) is maintained below a certain threshold. This is done to ensure acceptable system and call performance.

Radio spectrum being a limited resource, considerable engineering and technology effort is spent to ensure the most efficient use of the air interface. Fundamentally the air interface capacity per cell (sector) is limited by the data rate (in bits per second) that can be transferred across the air link for a given set of quality (FER) and reuse parameters. Also, well established traffic engineering/planning approaches are used to engineer the cellular networks such that the number of simultaneous active calls, resulting from the random call arrivals and departures, that exceed the capacity threshold is minimized. As mentioned before, the capacity usage of a particular call depends on various factors including the data rate. Typically, for a reasonable voice quality performance, a voice call transmits data at the rate of 8 kbps (kilo bits per second), 13 kbps, or upto 64 kbps depending on certain vocoders used. Wireless data services such as circuit switched data and packet switched data can allow data rates of 8 kbps up to 115 kbps per data call in current CDMA (IS-95), TDMA, and GSM cellular systems. Future extensions of these systems (cdma2000, W-CDMA) would allow upto 2 Mbps (mega bits per second) per data call.

In the current network architecture, the data IWF (206) provides an access/entry point for all IP/data connections to the wireless network. Various IP/data bandwidth management algorithms can be implemented to allocate bandwidth based on application demand (or based on class of traffic). However, the bandwidth control for IP/data connections based on the available localized capacity in the wireless network can not be performed. The data IWF (206), in the current networks, is not aware (or capable of using) the localized air link capacity information. In other words, when the data IWF (206) sends IP data packets to/from the mobile station (203), it may potentially cause significant degradation (or inefficiency) in the localized air interface link. In short, the ability to control IP data transmission (at the TCP (104), IP (105), or lower layers) based on the localized air interface link capacity does not exist.

OBJECTS AND ADVANTAGES

Accordingly, several objects and advantages of my invention are:

It is an object of the present invention to provide a system and method that combines the process and result of estimating the available capacity on the localized air link with the dynamic and real-time control, throttle, delay and queuing of certain (or all) classes of data traffic transmissions at TCP (104), IP (104), and/or lower layers of the protocol stack.

It is the object of the present invention to improve the overall throughput of a wireless voice/data network.

It is a further object of the present invention to delay, prioritize, and exploit the latency requirements of various classes of traffic by artificially controlling the burstiness of data packet transmissions to maximize the use of available capacity in a particular cell (sector) in the wireless network.

It is another object of the present invention to obtain estimates of the real-time capacity thresholds per cell (sector), and the real-time usage per cell (sector) using control and signaling messages from the wireless network (mobile, BTS, BSC, MSC, IWF).

It is an object of this invention to continually, dynamically improve and refine the capacity threshold estimates and the usage estimates based on various messages from the wireless network (mobile, BTS, BSC, MSC, IWF).

It is yet another object of the present invention to control the IP transmissions based on the real-time feedback provided by the externally estimated localized air link capacity per cell (sector).

It is the object of the present invention to allow different classes of IP data traffic to have different priorities for accessing the wireless network channel which has a varying bandwidth availability. In order to achieve these and other objectives, the present invention provides a system and method which estimates and uses the real-time available localized capacity per cell (sector) to schedule, throttle, delay or queue various classes of IP data traffic.

The present invention evaluates the control/signaling messages in the wireless network to obtain the number of simultaneous active calls in all cells (sectors), and to develop estimates of capacity thresholds, and available bandwidths. The control messages are to be obtained via tapping various interfaces (standard and proprietary) such as A interface (BSC-MSC) (207), L interface (MSC-IWF (208), BSC-IWF (209)), or Abis interface (BTS-BSC (210), BTS-MSC), or are obtained from entities which are an integral part of the MSC, BSC, BTS, mobile station, or any other element of the wireless network.

The present invention allows for obtaining the capacity threshold estimates and bandwidth availability estimates from a unit/device which is external (not an integral part) of the wireless network.

The present invention uses the localized bandwidth estimates obtained to dynamically control the data transmission of various classes of IP applications. The dynamic, real-time control of IP transmissions are via a combination of non-standard and standard bandwidth management methods such as use of TCP window size and IP layer queuing.

The combination of estimating the real-time localized air-interface capacity/bandwidth and using it to throttle, delay, and/or queue IP connections based on various classes of traffic provides a significant performance and capacity enhancement for a wireless data (and voice/data) network.

Other objects, features, and advantages of the present invention will become apparent from the following detailed description, in conjunction with the accompanied drawings.

BRIEF DESCRIPTION OF THE DRAWINGS

FIG. 6 shows the algorithm flow for estimating the localized usage and bandwidth availability per sector

FIG. 10 is a scenario where the present invention is interconnected with the data IWF and various application servers.

PREFERRED EMBODIMENT—DETAILED DESCRIPTION

The present invention utilizes the capacity estimates obtained via signaling/control messages from the wireless network (200) to dynamically throttle, delay, queue, and control various classes of IP traffic using layer 4 (TCP) (104) and layer 3 (IP) (105) mechanics.

Figure 1:
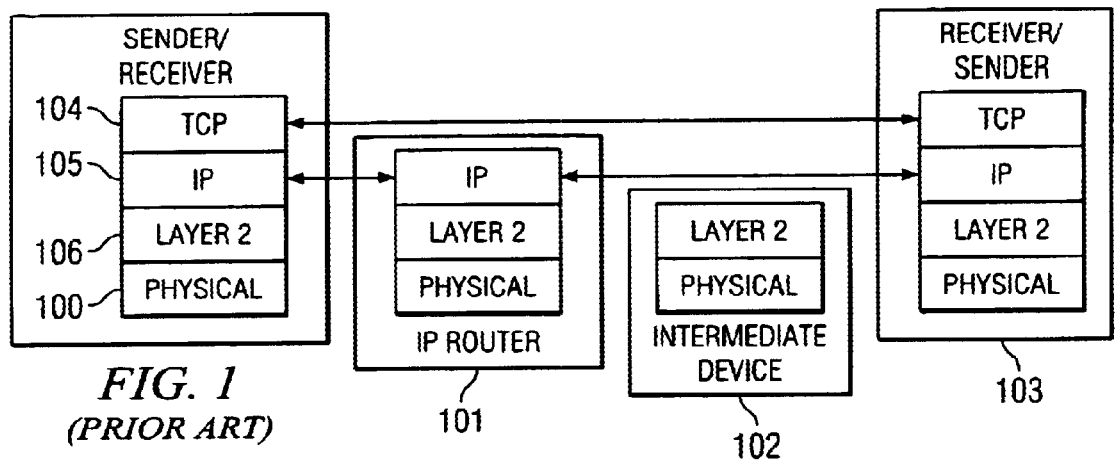
FIG. 1 is a prior art illustrating a typical TCP/IP protocol stack on various network devices.
Figure 2:
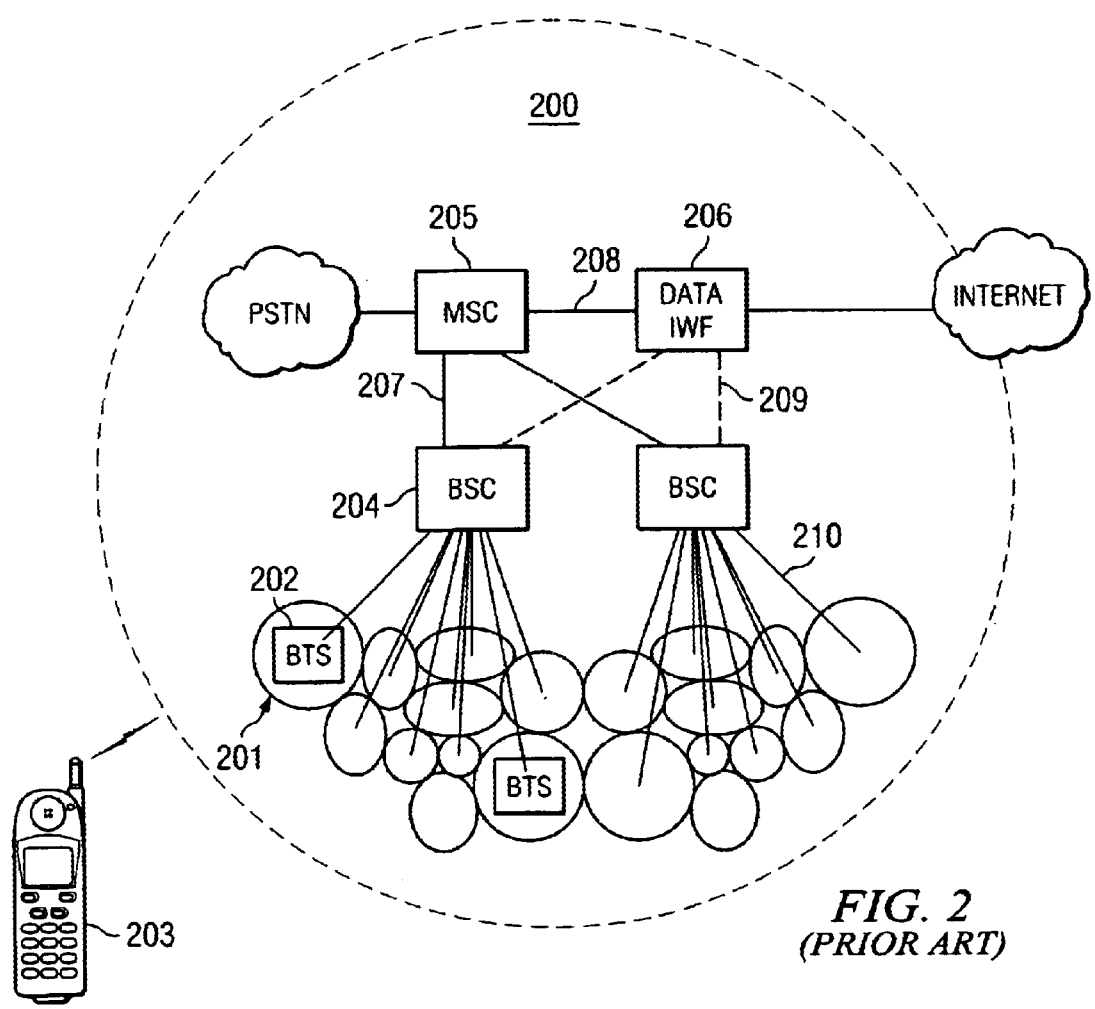
FIG. 2 shows an overview of the wireless/cellular network, and the key components in such network (prior art).
Figure 3:
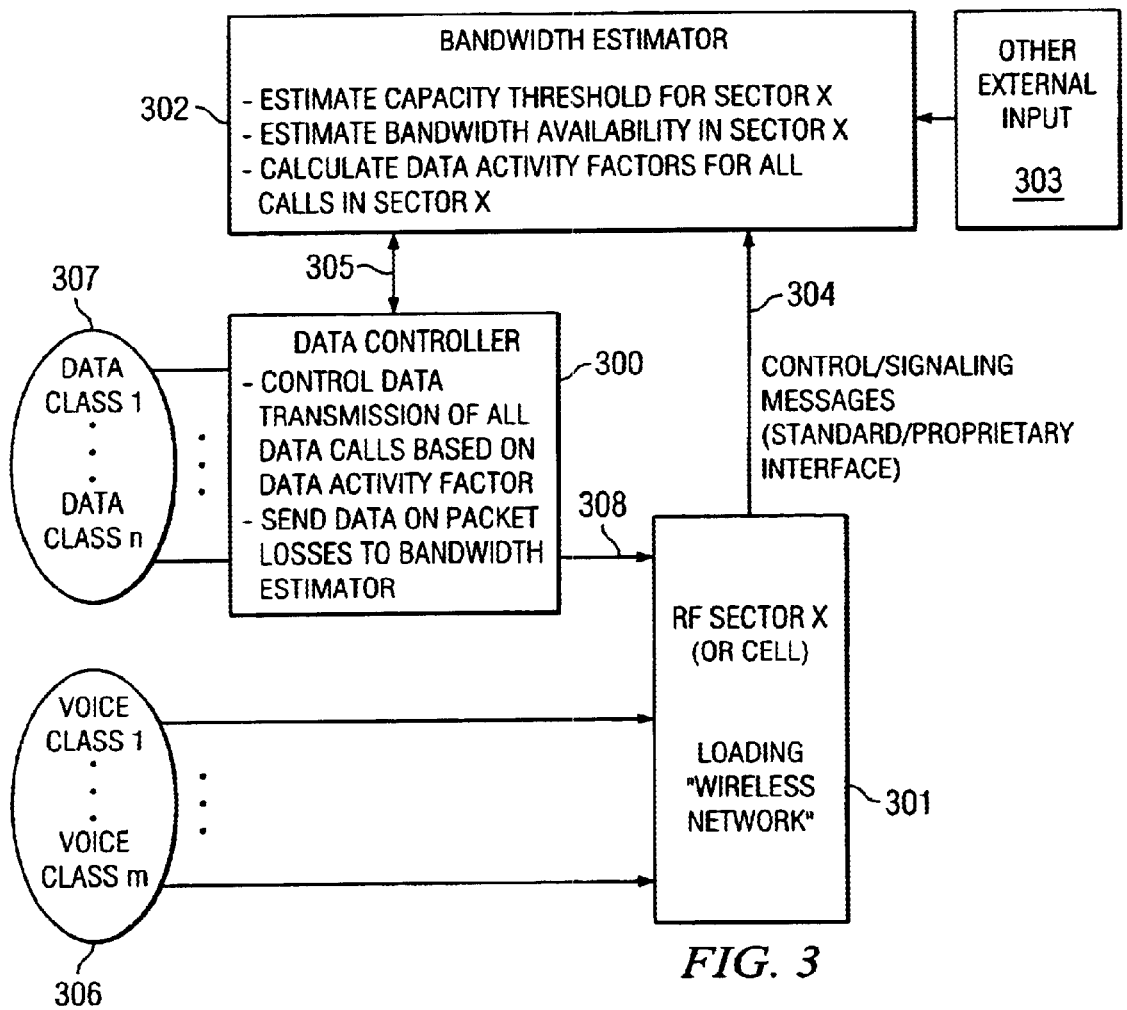
FIG. 3 shows a simple block diagram to illustrate the proposed invention in a system with m voice traffic classes and n data traffic classes.

FIG. 3 illustrates a simplified block diagram of the present invention supporting multiple classes of traffic voice and data (IP based). The data controller (300) is the device/method which controls the data transmission activity of all IP data connections via use of throttle, delay, or queuing. The data controller (300) uses standard and/or proprietary means (such as TCP window size control, IP layer queuing, etc.) to implement the recommended data transmission activity factor for all data calls. The cell (sector) (301) is the representative block indicating a certain cell (sector) and the loading/usage condition in that cell (sector). The bandwidth estimator (302) assesses the messages (signaling and control) flowing from the cell (sector) (201) to the MSC/IWF (205/206) to continuously (in real-time) estimate the localized capacity threshold in each cell (sector) and the bandwidth availability in each cell (sector). The bandwidth estimator (302) also computes the data transmission activity factors for all TCP data connections necessary to maximize the bandwidth usage in each sector. The bandwidth estimator provides the control signal to the data controller (300) to implement the data transmission activity factor for each data call.

The bandwidth estimator (302) obtains the following data (if available) via the control/signaling messages from the wireless network (MSC-BSC-BTS):

1. Call originations
2. Call terminations
3. Handoff updates
4. Call failures
5. Neighbor list updates
6. Failures due to air link capacity
7. Failures due to lack of hard resources
8. Call drops
9. Forward air link capacity
10. Reverse air link capacity
11. And other relevant messages The bandwidth estimator (302) communicates with the data controller (300) via a typical communication media (eg. Ethernet), but is not limited to such. The data exchanged between the bandwidth estimator, and the data controller is sent either in-band (part of the IP protocol data stream) or out-of-band (independent/separate from the IP protocol data stream).

Figure 4:
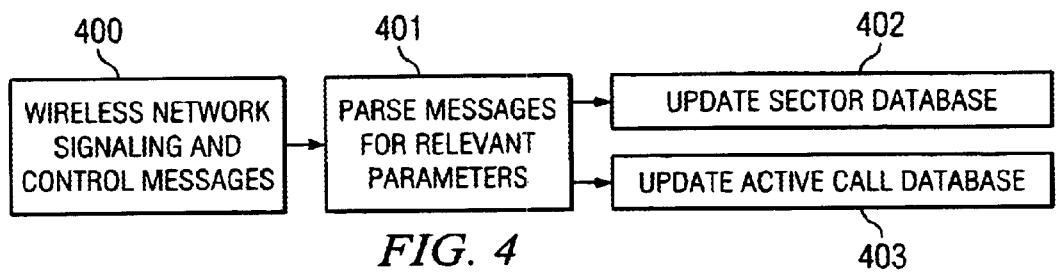
FIG. 4 shows a flow diagram for updating sector and active call database.

As shown in FIG. 4, the bandwidth estimator (302) parses the signaling/control messages (401) obtained from the wireless network (400), and maintains/updates two real-time databases-sector database (402) (which consists of all relevant information regarding a particular sector), and active call database (403) (which consists of all relevant information regarding a particular active call). These databases are updated real-time as the messages are obtained from the wireless network.

Figure 5:
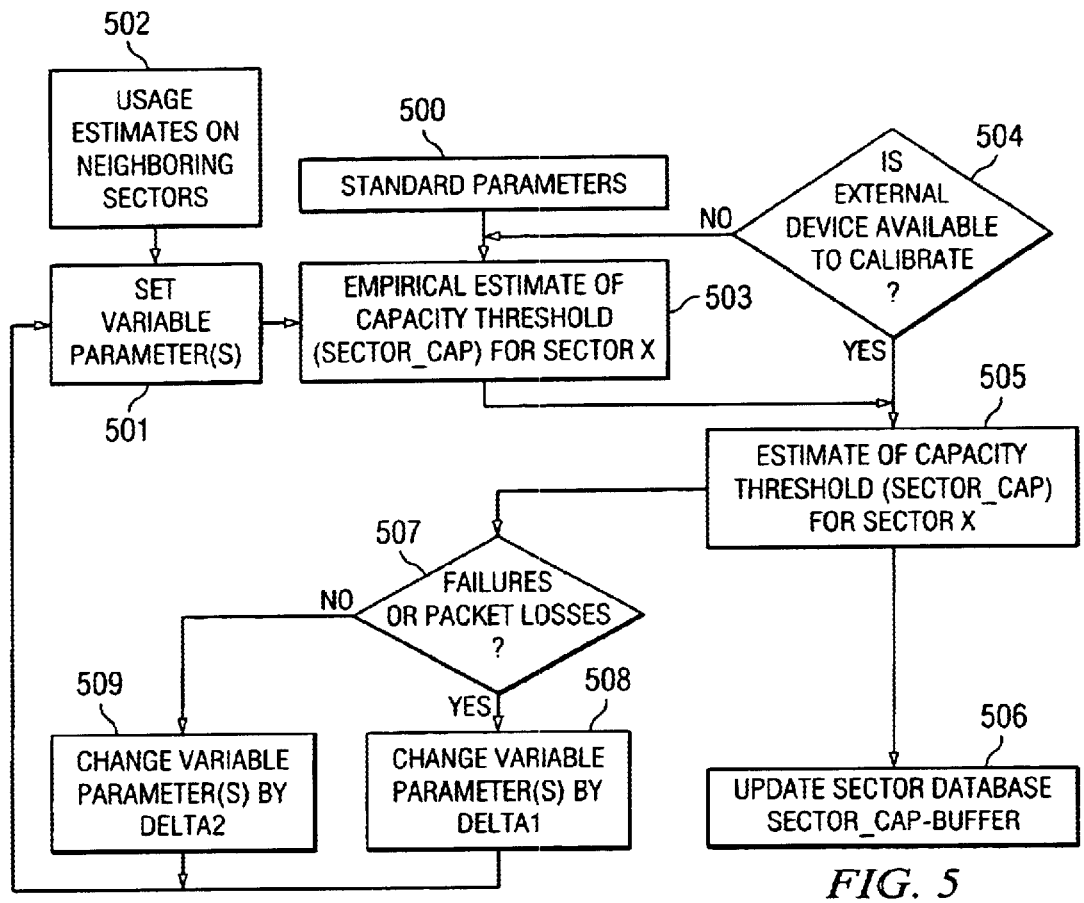
FIG. 5 shows the algorithm flow for estimating the localized capacity threshold per sector.

FIG. 5 illustrates the algorithm flow for estimating the capacity threshold per sector. If an external device (504) is available to calibrate the capacity threshold, then the capacity threshold estimate (505) should use the estimate provided by the external device. If not, an empirical estimate (503) of the capacity threshold is obtained using standard parameters (500) and variable parameters (501). The external device (504) can also provide calibration data based on drive testing and performance monitoring. The standard and variable parameters, and the capacity threshold estimate will be different for the uplink (mobile to MSC/BSC/BTS) and the downlink (MSC/BSC/BTS-mobile).

For example, for the uplink in CDMA/IS-95 based wireless system, the standard parameters could include the data rates, bit-energy to noise ratio target, provisioned channels (time-slots, codes, frequency channels) etc. and the variable parameters could include the frequency reuse factor, loading factor, etc. For the downlink in CDMA/IS-95 based wireless system, the standard parameters could include the pilot channel power, other overhead channel power, provisioned channels, etc. and the variable parameters could include the average traffic channel power. Although the above example of parameters indicates applicability of the present method to CDMA/IS95 system, the approach applies, in a broader sense, to all wireless systems where the air link capacity threshold varies over time and channel conditions.

The variable parameters are dynamically changed (508, 509) based on real-time information obtained regarding call failures and/or data packet losses (507) in the wireless network. Some or all variable parameters are also dynamically changed based on the relative usage estimates on neighboring cellsites (502). The estimated capacity threshold per sector is lowered by a predetermined buffer and is updated in the sector database (506) real-time.

FIG. 6 illustrates the algorithm flow for estimating the localized air link bandwidth availability per sector. The sector database (600) maintains real-time data on number of active voice and data users in a particular sector. The active call database (601) maintains real-time data on the transmission activity factor for all data calls. The bandwidth estimator utilizes the data on the number of active voice users of all classes (605), the number of active data users of all classes (603), the class-dependent parameters for all classes (604), and the data transmission activity factor for all data calls in the sector (602) to compute the usage estimate for the particular sector (609).

The usage estimate (609) is subtracted (606) from the capacity threshold estimate (506) to obtain the bandwidth availability estimate for the particular sector (607). The bandwidth availability estimate per sector is updated in the real-time sector database (608).

If an active data call with active transmission experiences a packet loss, the active call is assigned a packet loss timer, and the data transmission activity factor is set to "OFF".

Figure 7:
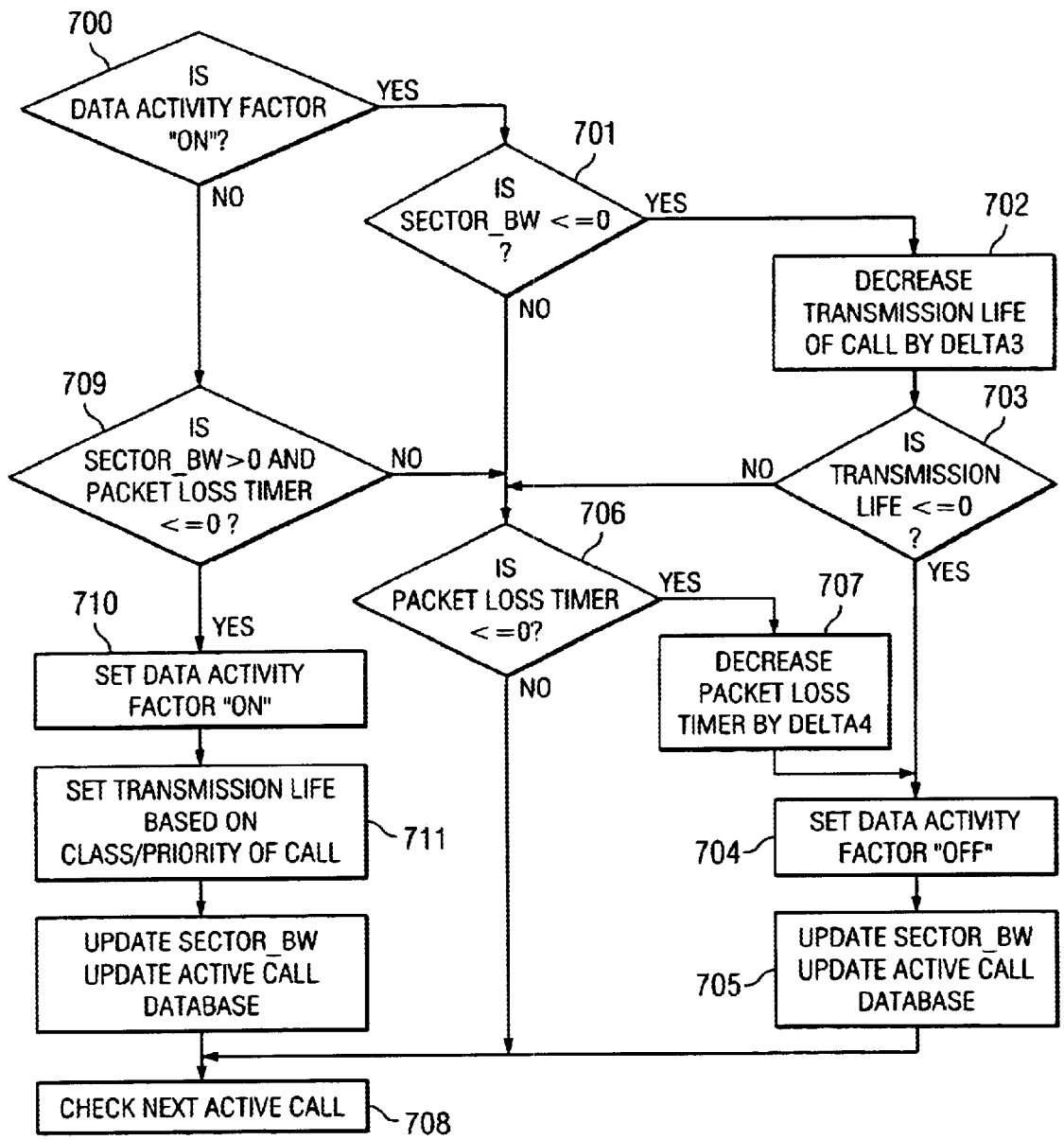
FIG. 7 shows the algorithm flow for computing the data transmission activity factor for each active data call.

FIG. 7 illustrates the algorithm flow of estimating the data transmission activity factor for all data calls using the bandwidth availability estimates, the priority/class of data traffic, and the information on packet failures. All active calls in the active call database are checked in the following manner. If the current data transmission activity factor is "ON " (700), then the bandwidth availability per sector is checked whether it has fallen below zero. If the bandwidth availability per sector is less than zero, then the transmission life of the data call is decreased by a predetermined factor (702). If the transmission life of the data call falls below zero (703), then the data transmission activity factor is set to "OFF " (704), and the respective sector and active call databases are updated (705). If either (701) or (703) result in a negative evaluation, then the packet loss timer is checked for a non-negative number (706). If the packet loss time is positive, then the timer is decreased by a predetermined factor (707), and the data transmission activity factor is set to "OFF " (704).

If the data transmission factor for the active data call is "OFF", then the bandwidth availability estimate for the particular sector is checked for a nonnegative number (709). A positive bandwidth availability factor indicates room for an additional data transmission. If the data call has a zero or negative packet loss timer, then the transmission activity factor is set "ON " (710). Upon turning "ON", the data call is assigned a transmission life, which is dependent on the class/priority of the data call (711). The setting of transmission life is in a way reserving the data transmission activity period based on the class/priority of the specific data call. Upon change in the data transmission activity factor of the active data call, the bandwidth availability estimate for the particular sector is changed and the respective sector database entry is updated (705). The above computations are repeated for all active calls in the active call database (708).

A IP data connection could be assigned a "high priority " class, but based on some real-time statistics such as TCP packet losses, or call failures, the present invention dynamically changes the priority class, thus enabling other reliable TCP connections a higher priority.

Based on the available localized capacity estimates, the bandwidth estimator establishes the data transmission activity factor for all data connections. Based on current values/estimates of bandwidth availability, usage estimate, data transmission activity factor, and the priority classes of all active data calls, a new set of data transmission factors is computed such that the new resulting bandwidth availability approaches zero (thus indicating maximization of usage).

The data transmission activity factors for each TCP connection, once established (as discussed above) is implemented by either changing the TCP window size dynamically, or queuing the packets at IP layer, or a combination of both as optimized for the application. The data controller (300) uses the data transmission activity factors provided by the bandwidth estimator to implement necessary control on each individual data connection via the TCP, IP, or lower layers of the protocol stack.

Figure 8:
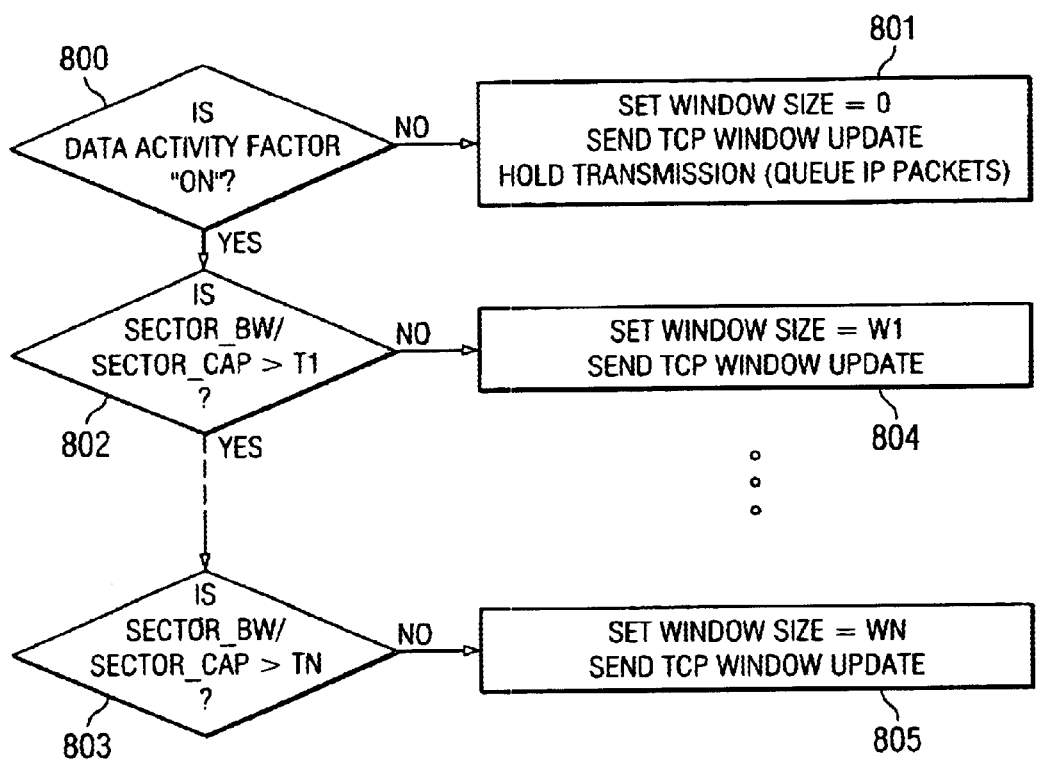
FIG. 8 shows the algorithm flow for computing the TCP window size and implementing local queuing for each active data call.

FIG. 8 illustrates how the window size is set based on the data transmission activity factors. If the data transmission activity factor is "OFF", then the window size is set to zero, and the data controller updates the TCP peers with the window size of zero, and queues the IP packets (if necessary). The data controller can also trigger other control mechanisms (if available) at the TCP, IP, and lower layers of the protocol stack. If the data transmission activity factor is "ON", then the necessary window size is computed based on the relative bandwidth availability in the particular sector (ratio of the bandwidth availability to the capacity threshold). The necessary window updates are sent to the respective TCP peers.

The present invention of estimating and using the localized air link capacity threshold and bandwidth availability to establish data transmission activity factors of all active data calls applies to all wireless systems such as, GSM, WCDMA, cdma2000, IS-95 (cdmaone) and TDMA, deploying shared or contention based air links.

The TCP window size update is sent via a standard ACK message (TCP acknowledgement message). If no ACK needs to be sent, the window update is sent via a duplicate ACK message (standard TCP protocol).

In summary, the present invention uses the data transmission activity factors estimated by the bandwidth estimator and the data controller to intervene the TCP protocol and to change the header information accordingly. In addition, the present invention also allows use of other control mechanisms available to implement the data transmission activity factors recommended by the bandwidth estimator.

Figure 9:
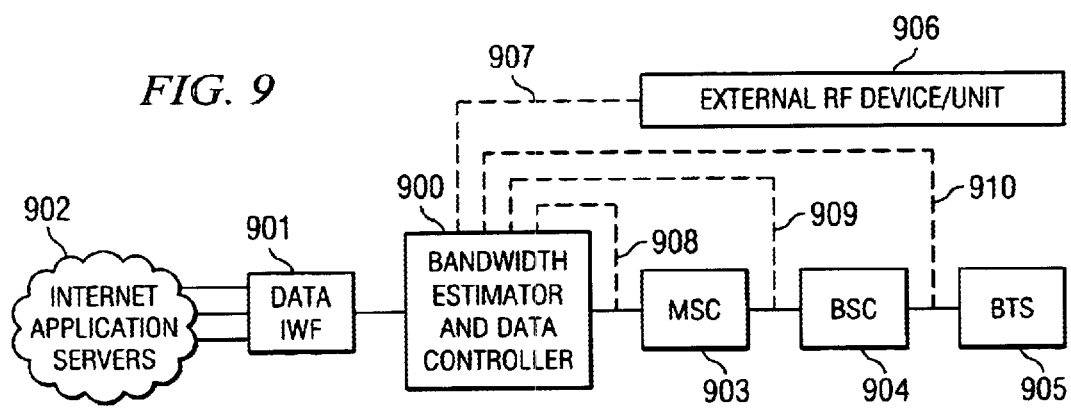
FIG. 9 is an an alternate scenario of the present invention interconnected with the wireless network and the data IWF.

The present invention implements the bandwidth estimator (302) by tapping into the control and signaling messages in the wireless network. As illustrated in FIG. 9, the control and signaling messages are obtained via tapping the interfaces between the MSC (903) and the IWF (901), or the interface between the MSC (903) and the BSC (904), or the interface between the MSC (903) and the BTS (905), or the interface between the BSC (904) and the BTS (905), and/or the combination of any of the above. The present invention also obtains (if available) direct interference/capacity estimates from an external unit (906).

FIG. 9 also illustrates a deployment scenario where, the present invention (device) (900) is interconnected in-between the IWF (901) and the wireless network elements (903, 904, 905). In such a scenario the device (900) still maintains links (908, 909, 910) from the bandwidth estimator subsystem to the wireless network elements and/or to an external unit (906). The data IWF (901) in this scenario would interface with various data/internet application servers (902).

FIG. 10 illustrates a scenario where the present invention (device) (1000) is interconnected with the data IWF (1002) and one or more application servers (1001). In such configurations, the device (1000) still maintains the links (1005, 1006, 1007) from the bandwidth estimator to the wireless network elements (1003) or to an external unit (1004). In such scenario, the functional elements of the present invention (bandwidth estimator, and data controller) may be centralized in the device, or may be distributed across the internet application servers.

Figure 11:
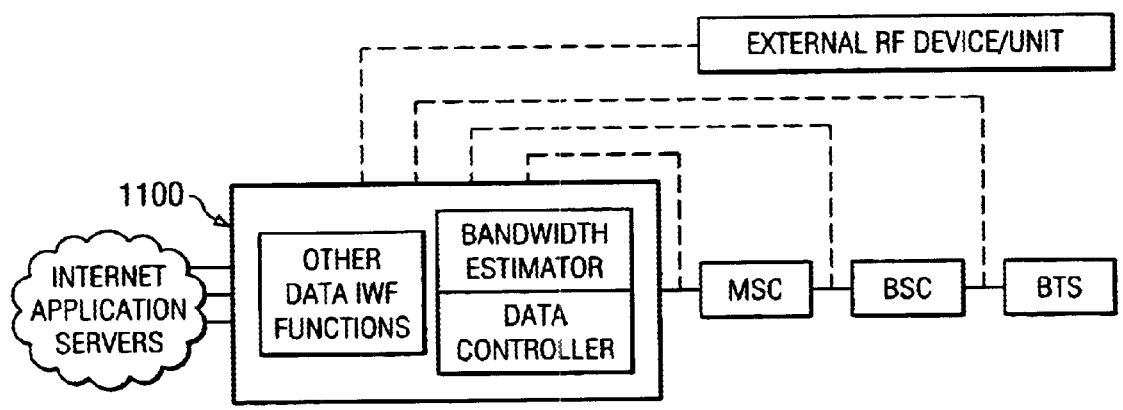
FIG. 11 is a scenario where the present invention (data controller and bandwidth estimator) is integrated with the data IWF.

FIG. 11 illustrates the integration of the present invention (device, algorithms, and design) as part of the IWF (1100). In such scenarios, the IWF still maintains the links from the bandwidth estimator subsystem to the wireless network elements and/or to an external unit.

Figure 12:
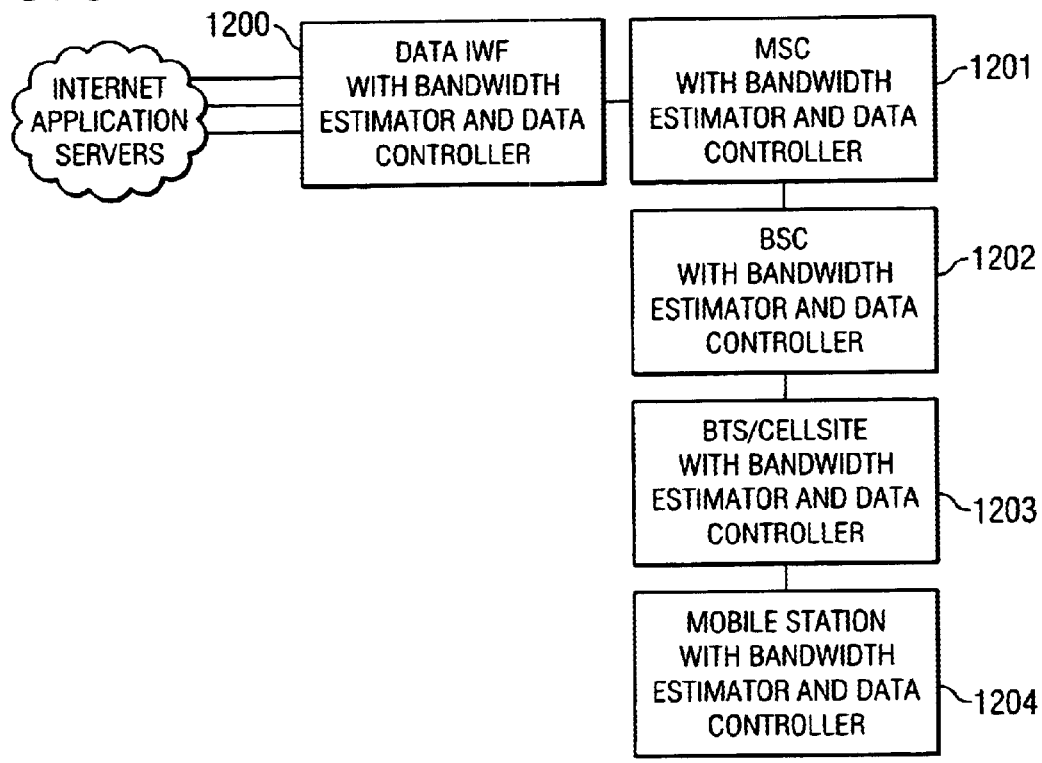
FIG. 12 shows scenarios where the present invention (data controller and bandwidth estimator) could potentially be integrated with various wireless network elements such as data IWF, MSC, BSC, BTS, and mobile station.
Figure 13:
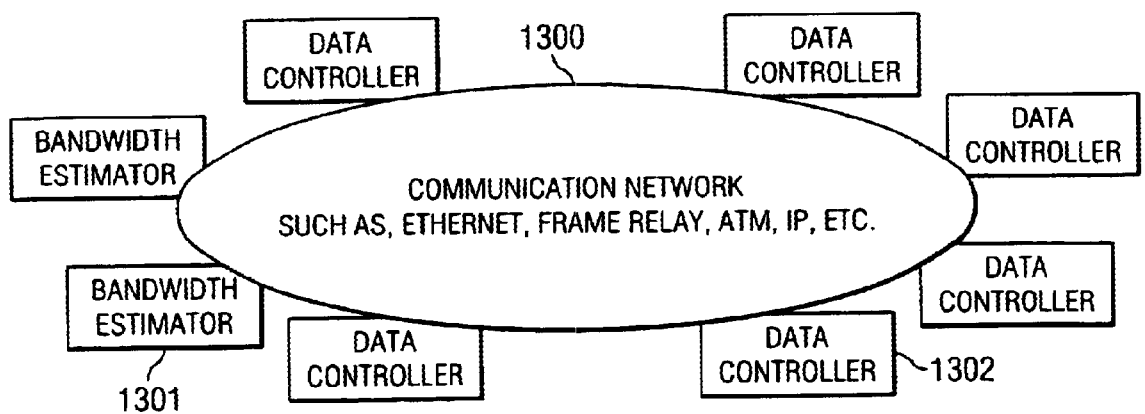
FIG. 13 shows how multiple (plurality) of bandwidth estimators can be interconnected to a multiple (plurality) of data controllers via a communication media.

As illustrated in FIG. 12, the bandwidth estimator and the data controller can be implemented as integral part of the data IWF (1200), the MSC (1201), the BSC (1202), the BTS (1203), the Mobile Station (1204), and/or the Application Servers (1205). In case where the bandwidth estimator and the data controller are integral part of the either the BTS or the Mobile Station, the estimates obtained could be based on localized radio measurements obtained by the BTS and/or the Mobile Station. Finally, FIG. 13 indicates that the data controllers and the bandwidth estimator can functionally or physically be separate entities interconnected via a standard or proprietary communication media or network.

CONCLUSIONS, RAMIFICATIONS, AND SCOPE

Accordingly, it can be seen that the above described system allows efficient transmission control of data calls over wireless network based on the priority/class of traffic, and the localized air-interface capacity threshold and available bandwidth estimates obtained using the messages from the wireless network.

Although the description above contains many specificities, these should not be construed as limiting the scope of the invention but as merely providing illustrations of some of the presently preferred embodiments of this invention. Various other embodiments and ramifications are possible within it's scope. For example, instead of the use of TCP transmission window size update, an intrinsic control message can be sent to the data sender (transmitter) indicating the transmission activity. Various other transmission control methods such as IP queuing, or lower layer protocols, can be used. In addition to using the control and signaling messages from the standard and proprietary interfaces from the wireless network, the internal messages from the BTS, BSC, MSC, IWF, and/or other network elements can also be used. The use of priorities and classes of traffic can be implemented in various ways such as reserving the data transmission activity for a period of time, bypassing or overturning current activities of other lower priority data connections, or allowing a specific transmission size based on the priority. The bandwidth estimator and the data controller can maintained as independent entities, or can be integrated with various network elements such as the MSC, BSC, BTS, IWF, Servers, etc.

Thus the scope of the invention should be determined by the appended claims and their legal equivalents, rather than by the examples given.

What is claimed is:

1. A method for transmission control of data connections over a wireless network, comprising:
   receiving input parameters specific to a wireless sector;
   obtaining a capacity threshold for the wireless sector based on the input parameters;
   determining a usage estimate for the wireless sector;
   determining a real-time capacity estimate based on the capacity threshold and the usage estimate; and
   dynamically controlling transmission activity of data traffic over the wireless sector based on the real-time capacity estimate for the wireless sector, the capacity threshold and the usage estimate comprising real-time values.

2. A method for transmission control of data connections over a wireless network, comprising:
   receiving input parameters specific to a wireless sector;
   obtaining a capacity threshold for the wireless sector based on the input parameters;
   determining the capacity threshold based on static and variable parameters;
   determining a usage estimate for the wireless sector;
   determining a real-time capacity estimate based on the capacity threshold and the usage estimate; and
   dynamically controlling transmission activity of data traffic over the wireless sector based on the real-time capacity estimate for the wireless sector.

3. The method of claim 2, wherein the static parameters comprise at least one of data rate, bit energy to noise ratio target, provisioned channel, time-slot, code, frequency channel, pilot channel power, and overhead channel power parameters.

4. The method of claim 2, wherein the variable parameters comprise at least one of frequency reuse factor, loading factor and average traffic channel power parameters.

5. A method for transmission control of data connections over a wireless network, comprising:
   receiving input parameters specific to a wireless sector;
   obtaining a capacity threshold for the wireless sector based on the input parameters, wherein the capacity threshold is determined based on at least one of call origination, call termination, handoff update, call failure message, and data packet loss parameters;
   determining a usage estimate for the wireless sector;
   determining a real-time capacity estimate based on the capacity threshold and the usage estimate; and
   dynamically controlling transmission activity of data traffic over the wireless sector based on the real-time capacity estimate for the wireless sector.

6. The method of claim 5, wherein the capacity threshold estimate is further determined based on relative loading in neighboring wireless sectors.

7. A method for transmission control of data connections over a wireless network, comprising:
   receiving input parameters specific to a wireless sector;
   obtaining a capacity threshold for the wireless sector based on the input parameters;
   determining a usage estimate for the wireless sector based on at least one of a number of active users and class-dependent parameters;
   determining a real-time capacity estimate based on the capacity threshold and the usage estimate; and
   dynamically controlling transmission activity of data traffic over the wireless sector based on the real-time capacity estimate for the wireless sector.

8. A method for transmission control of data connections over a wireless network, comprising:
   determining a real-time capacity estimate for a wireless sector;
   dynamically controlling transmission activity of data traffic over the wireless sector based on the real-time capacity estimate for the wireless sector;
   wherein the data traffic comprises traffic transmitted over transmission control protocol/Internet protocol (TCP/IP) connections; and
   dynamically controlling transmission activity of data traffic in the TCP/IP connections by performing TCP/IP layer queuing based on the capacity estimate.

9. A system for transmission control of data connections over a wireless network, comprising:
   means for receiving input parameters specific to a wireless sector;
   means for obtaining a capacity threshold for the wireless sector based on the input parameters;
   means for determining a usage estimate for the wireless sector;

means for determining a real-time capacity estimate based on the capacity threshold and the usage estimate; and means for dynamically controlling transmission activity of data traffic over the wireless sector based on the real-time capacity estimate for the wireless sectors wherein the capacity threshold and the usage estimate comprise real-time values.

10. A system for transmission control of data connections over a wireless network, comprising:

means for receiving input parameters specific to a wireless sector;

means for obtaining a capacity threshold for the wireless sector based on the input parameters;

means for determining the capacity threshold based on static and variable parameters;

means for determining a usage estimate for the wireless sector;

means for determining a real-time capacity estimate based on the capacity threshold and the usage estimate; and means for dynamically controlling transmission activity of data traffic over the wireless sector based on the real-time capacity estimate for the wireless sector.

11. The system of claim 10, wherein the static parameters comprise at least one of data rate, bit energy to noise ratio target, provisioned channel, time-slot, code, frequency channel, pilot channel power, and overhead channel power parameters.

12. The system of claim 10, wherein the variable parameters comprise at least one or more of frequency reuse factor, loading factor and average traffic channel power parameters.

13. The system of claim 9, wherein the capacity threshold is determined based on at least one of call origination, call termination, handoff update, call failure message, and data packet parameters.

14. The system of claim 13, wherein the capacity threshold estimate is further determined based on relative loading in neighboring wireless sectors.

15. The system of claim 9, further comprising means for determining the usage estimate based on at least one of a number of active users and class-dependent parameters.

16. A system for transmission control of data connections over a wireless network, comprising:

means for determining a real-time capacity estimate for a wireless sector;

means for dynamically controlling transmission activity of data traffic over the wireless sector based on the real-time capacity estimate for the wireless sector;

wherein the data traffic comprises traffic transmitted over transmission control protocol/Internet protocol (TCP/IP) connections; and means for dynamically controlling transmission activity of data traffic in the TCP/IP connections by performing TCP/IP layer queuing based on the capacity estimate.

17. A system for transmission control of data connections over a wireless network, comprising:

logic encoded on media; and the logic operable to receive input parameters specific to a wireless sector; obtain a capacity threshold for the wireless sector based on the input parameters, determine a usage estimate for the wireless sector, determine a real-time capacity estimate based on the capacity threshold and the usage estimate and dynamically control transmission activity of data traffic over the wireless sector based on the real-time capacity estimate for the wireless sectors, the capacity threshold and the usage estimate comprising real-time values.

* * * * *

UNITED STATES PATENT AND TRADEMARK OFFICE
CERTIFICATE OF CORRECTION

PATENT NO. : 6,697,378 B1
DATED : February 24, 2004
INVENTOR(S) : Patel

It is certified that error appears in the above-identified patent and that said Letters Patent is hereby corrected as shown below:

Column 11,
Line 5, after "wireless", delete "sectors" and insert -- sector --.

Column 12,
Line 32, after "wireless" delete "sectors"and insert -- sector --.

Signed and Sealed this

Ninth Day of November, 2004

JON W. DUDAS
*Director of the United States Patent and Trademark Office*